(12) United States Patent
Henry (10) Patent No.: US 10,869,030 B2
(45) Date of Patent: Dec. 15, 2020

(54) METHOD OF CODING AND DECODING IMAGES, A CODING AND DECODING DEVICE, AND CORRESPONDING COMPUTER PROGRAMS

(71) Applicant: Orange, Paris (FR)

(72) Inventor: Felix Henry, Saint Gregoire (FR)

(73) Assignee: ORANGE, Paris (FR)

( * ) Notice: Subject to any disclaimer, the term of this patent is extended or adjusted under 35 U.S.C. 154(b) by 236 days.

(21) Appl. No.: 14/431,202

(22) PCT Filed: Sep. 16, 2013

(86) PCT No.: PCT/FR2013/052117
§ 371 (c)(1),
(2) Date: Mar. 25, 2015

(87) PCT Pub. No.: WO2014/049224
PCT Pub. Date: Apr. 3, 2014

(65) Prior Publication Data
US 2015/0281689 A1    Oct. 1, 2015

(30) Foreign Application Priority Data
Sep. 27, 2012 (FR) ...................................... 12 59110

(51) Int. Cl.
*H04N 19/105* (2014.01)
*H04N 19/176* (2014.01)
(Continued)

(52) U.S. Cl.
CPC ......... *H04N 19/105* (2014.11); *H04N 19/102* (2014.11); *H04N 19/117* (2014.11);
(Continued)

(58) Field of Classification Search
CPC .. H04N 19/102; H04N 19/105; H04N 19/117; H04N 19/137; H04N 19/172; H04N 19/176; H04N 19/573; H04N 19/80
See application file for complete search history.

(56) References Cited

U.S. PATENT DOCUMENTS

| | | | |
|---|---|---|---|
| 6,754,370 B1 * | 6/2004 | Hall-Holt | G01B 11/25 356/3 |
| 2003/0072364 A1 * | 4/2003 | Kim | H04N 19/147 375/240.03 |

(Continued)

FOREIGN PATENT DOCUMENTS

| | | |
|---|---|---|
| EP | 2445216 A1 | 4/2012 |
| WO | 2007011851 A2 | 1/2007 |

OTHER PUBLICATIONS http://fr.wikipedia.org/wiki/D%C3%A9convolution_de_Wiener.
http://fr.wikipedia.org/w/index.php?title=Algorithme_g%C3%A9n%C3%A9tique&oldid=83138231.
English translation of the International Written Opinion dated Mar. 27, 2015 for corresponding International Application No. PCT/FR2013/052117, filed Sep. 16, 2013.

(Continued)

*Primary Examiner* — Md N Haque
(74) *Attorney, Agent, or Firm* — David D. Brush; Westman, Champlin & Koehler, P.A.

(57) ABSTRACT

A method is provided for coding at least one current image. The method includes: determining at least one parameter of a predetermining function, the function being able to transform a first subset of a set of previously decoded reference images into an approximation of a second subset of images of the set of reference images; applying the function according to the parameter determined to a third subset of the set of reference images, the third subset being different from the first subset, so as to obtain another set of previously decoded reference images; and coding the current image on the basis of the obtained set of reference images.

14 Claims, 7 Drawing Sheets

(51) Int. Cl.
*H04N 19/172* (2014.01)
*H04N 19/137* (2014.01)
*H04N 19/573* (2014.01)
*H04N 19/102* (2014.01)
*H04N 19/117* (2014.01)
*H04N 19/80* (2014.01)

(52) U.S. Cl.
CPC ......... *H04N 19/137* (2014.11); *H04N 19/172* (2014.11); *H04N 19/176* (2014.11); *H04N 19/573* (2014.11); *H04N 19/80* (2014.11)

(56) References Cited

U.S. PATENT DOCUMENTS

| | | | | |
|---|---|---|---|---|
| 2006/0114989 | A1* | 6/2006 | Panda | H04N 19/176 375/240.03 |
| 2010/0220788 | A1* | 9/2010 | Wittmann | H04N 19/176 375/240.16 |
| 2010/0246680 | A1* | 9/2010 | Tian | H04N 19/50 375/240.16 |
| 2012/0121009 | A1* | 5/2012 | Lu | H04N 19/172 375/240.02 |

OTHER PUBLICATIONS

International Search Report dated Dec. 9, 2013 for corresponding International Application No. PCT/FR2013/052117, filed Sep. 16, 2013.

Alexis M. Tourapis et al., "Direct Macroblock Coding for Predictive (P) Pictures in the H.264 Standard", Visual Communications and Image Processing; Jan. 20, 2004-Jan. 20, 2004; San Jose, Jan. 20, 2004 (Jan. 20, 2004), XP030081301.

Girod B. et al., "Affine Multipicture Motion-Compensated Prediction", IEEE Transactions on Circuits and Systems for Video Technology, IEEE Service Center, Piscataway, NJ, US, vol. 15, No. 2, Feb. 1, 2005 (Feb. 1, 2005), pp. 197-209, XP011126403.

Srinivasan S. et al., "Windows Media Video 9: Overview and Applications", Signal Processing. Image Communication, Elsevier Science Publishers, Amsterdam, NL, vol. 19, No. 9, Oct. 1, 2004 (Oct. 1, 2004), pp. 851-875, XP004607151.

Park S. et al., "TE3: Motion Compensation with Adaptive Warped Reference", 3 JCT-VC Meeting; 94. MPEG Meeting; Oct. 7, 2010-Oct. 15, 2010; Guangzhou; (Joint Collaborative Team on Video Coding of ISO/IETCJTC1/SC29/WG11 and ITU-T SG. 16); URL: Http://WFTP3.ITU.INT/AV-ARCH-JCTVC-SITE/,, No. JCTVC-C0333, Oct. 1, 2010 (Oct. 1, 2010), XP030007740.

* cited by examiner

METHOD OF CODING AND DECODING IMAGES, A CODING AND DECODING DEVICE, AND CORRESPONDING COMPUTER PROGRAMS

CROSS REFERENCE TO RELATED APPLICATIONS

This Application is a Section 371 National Stage Application of International Application No. PCT/FR2013/052117, filed Sep. 16, 2013, the content of which is incorporated herein by reference in its entirety, and published as WO 2014/049224 on Apr. 3, 2014, not in English.

FIELD OF THE INVENTION

The present invention relates in general to the field of processing images, and more precisely to coding and decoding digital images and sequences of digital images.

The invention may thus be applied in particular to video coding as performed in current video coders (MPEG, H.264, etc.), or future video coders ITU-T/VCEG (HEVC) or ISO/MPEG (HVC).

BACKGROUND OF THE INVENTION

The HEVC standard as described in the document "Joint collaborative team on video coding (JCT-VC) of ITU-T SG16 WP3 and ISO/IEC JTC1/SC29/WG11 10th Meeting: Stockholm, SE, 11-20 Jul, 2012" is similar to the preceding standard H.264 in the sense that it may make use of a block representation of the video sequence.

As in the H.264 standard, the above-mentioned HEVC standard makes use of pixel prediction for a current image on the basis of other pixels belonging either to the same image ("intra" prediction), or else to one or more preceding images of the sequence ("inter" prediction) that have already been decoded. Such preceding images are conventionally referred to as "reference" images and they are stored in memory both in the coder and in the decoder. Inter prediction is commonly referred to as "movement-compensation" prediction.

For this purpose, images are split up into macroblocks, which are then subdivided into blocks that are themselves constituted by pixels. Each block or macroblock is coded by intra or inter image prediction.

Conventionally, the coding of a current block is performed with the help of a prediction of the current block, delivering a predicted block, and of a prediction residue that corresponds to the difference between the current block and the predicted block. This prediction residue, also referred to as the residual block, is transmitted to the decoder, which then reconstructs the current block by adding the residual block to the prediction.

The prediction of the current block is established with the help of information that has already been reconstructed. With inter prediction, such information consists in particular in at least one prediction block, i.e. a block of a reference image that has previously been coded and then decoded. Such a prediction block is specified by:
the reference image to which it belongs; and
the motion vector that describes the movement between the current block and the prediction block.

The resulting residual block is then transformed, e.g. by using a transform of the discrete cosine transform (DCT) type. The coefficients of the transformed residual block are then quantified, and then coded using entropy coding.

Decoding is performed image by image, and for each image, block by block or macroblock by macroblock. For each (macro)block, the corresponding elements of the stream are read. Inverse quantification and inverse transformation are then applied to the coefficients of the residual block(s) associated with the (macro)block. Thereafter, the prediction of the (macro)block is calculated and the (macro)block is reconstructed by adding the prediction to the decoded residual block(s).

In that compression technique, it is the transformed, quantified, and then coded residual blocks that are transmitted to the decoder in order to enable it to reconstruct the decoded image(s).

During inter prediction, it can happen that the reference images used for coding or decoding the current image are not very similar to the current image in terms of texture or of rendering movement. The accuracy of the inter prediction of the current image is then of poor quality, and that degrades the performance of inter coding the current image.

SUMMARY OF THE INVENTION

One of the objects of the invention is to remedy the drawbacks of the above-mentioned prior art.

To this end, the present invention provides a method of coding at least one current image. Such a coding method is remarkable in that it comprises the steps of:
determining at least one parameter of a predetermined function, such a function being suitable for transforming a first subset of a set of previously decoded reference images into an approximation of a second subset of images of the set of reference images;
applying the above-specified function with the determined parameter to a third subset of the set of reference images, the third subset being different from the first subset, thereby obtaining another set of previously decoded reference images; and
coding the current image from the resulting set of reference images.

Such a provision has the advantage of coding the current image from one or more reference images that are more similar to the current image than the reference images available on coding and used conventionally for coding the current image. This leads to better accuracy in predicting movement in the current image, and thus to inter coding of the image that is much finer.

In a particular implementation, the step of determining at least one parameter is performed by maximizing a predetermined similarity criterion between said approximation of the second subset of reference images and the second subset of reference images.

Such a provision makes it possible to optimize the performance in compressing the current image, since the parameter that is obtained is thus made to be the most suitable for predicting a future image in a manner that is as accurate as possible.

In another particular implementation, the third subset of reference images comprises one or more reference images that are the closest in time to the current image.

Such a provision makes it possible to apply the parametric function to reference images that have the greatest probability of being the most similar possible to the current image in terms of texture and movement. This results in optimizing the accuracy of the prediction of the current image and in better performance in compressing it.

In yet another particular implementation, the step of applying the above-specified function is performed using a parameter other than the determined parameter, which other parameter is calculated beforehand from the determined parameter.

Such a provision makes it possible to adapt the parameter(s) of the predetermined function to the time shift that exists between at least the reference image that immediately precedes the current image and the current image for coding in such a manner that the other set of reference images obtained after applying said function contains at least one reference image that is of better quality in terms of texture and movement and that corresponds better in time with the current image for coding.

The invention also provides a coder device for coding at least one current image by performing the above-specified coding method.

Such a coder device is remarkable in that it comprises:
means for determining at least one parameter of a predetermined function, said function being suitable for transforming a first subset of a set of previously decoded reference images into an approximation of a second subset of images of the set of reference images;
means for applying the above-specified function with the determined parameter to a third subset of the set of reference images, the third subset being different from the first subset, in order to obtain another set of previously decoded reference images; and
means for coding the current image from the resulting set of reference images.

The invention also provides a method of decoding a coded current image.

Such a decoding method is remarkable in that it comprises the steps of:
determining at least one parameter of a predetermined function, the above-specified function being suitable for transforming a first subset of a set of previously decoded reference images into an approximation of a second subset of images of the set of reference images;
applying the above-specified function with the determined parameter to a third subset of the set of reference images, the third subset being different from the first subset, thereby obtaining another set of previously decoded reference images; and
decoding the current image from the resulting set of reference images.

In a manner similar to coding, such a provision has the advantage of decoding the current image from one or more reference images that are more similar to the current image than the reference images available on decoding and used conventionally for decoding the current image. This results in better accuracy in the prediction of movement in the current image for decoding. The reconstruction of the current image is thus found to be of better quality.

In a particular implementation, the step of determining at least one parameter is performed by maximizing a predetermined similarity criterion between said approximation of the second subset of reference images and the second subset of reference images.

In another particular implementation, the third subset of reference images comprises one or more reference images that are the closest in time to the current image.

In yet another particular implementation, the step of applying the above-specified function is performed using a parameter other than the determined parameter, which other parameter is calculated beforehand from the determined parameter.

The invention also provides a device for decoding at least one current image and for performing the above-specified decoding method.

Such a decoder device is remarkable in that it comprises:
means for determining at least one parameter of a predetermined function, the above-specified function being suitable for transforming a first subset of a set of previously decoded reference images into an approximation of a second subset of images of the set of reference images;
means for applying the above-specified function with the determined parameter to a third subset of the set of reference images, the third subset being different from the first subset, in order to obtain another set of previously decoded reference images; and
means for decoding the current image from the resulting set of reference images.

The invention also provides a computer program including instructions for performing the coding method or the decoding method of the invention, when executed on a computer.

The program may use any programming language, and be in the form of source code, object code, or code intermediate between source code and object code, such as in a partially complied form, or in any other desirable form.

The invention also provides a computer-readable data medium carrying a computer program, the program including instructions adapted to performing the coding or decoding method of the invention as described above.

The data medium may be any entity or device capable of storing the program. For example, the medium may comprise storage means such as a read only memory (ROM), e.g. a compact disk (CD) ROM or a microelectronic circuit ROM, or indeed it may comprise magnetic recording means, e.g. a hard disk, or a universal serial bus (USB) key.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit having the program incorporated therein, the circuit being adapted to execute or to be used in the execution of the above-specified coding or decoding method.

The above-specified coder device and the corresponding computer program present at least the same advantages as those conferred by the coding method of the present invention.

The above-specified decoder device, and the corresponding computer program and data medium present at least the same advantages as those conferred by the decoding method of the present invention.

BRIEF DESCRIPTION OF THE DRAWINGS

Other characteristics and advantages appear on reading the following description of preferred implementations given with reference to the figures, in which.

DETAILED DESCRIPTION OF THE CODING METHOD OF THE INVENTION

An implementation of the invention is described below in which the coding method of the invention is used for coding an image or a sequence of images into a binary stream close to the stream obtained by coding in compliance with the HEVC standard that is currently being prepared, for example.

In this implementation, the coding method of the invention may be implemented by way of example in software manner or in hardware manner by modifying a coder initially in compliance with the HEVC standard. The coding method of the invention is represented in the form of an algorithm comprising steps C1 to C8 as shown in FIG. 1.

Figure 2:
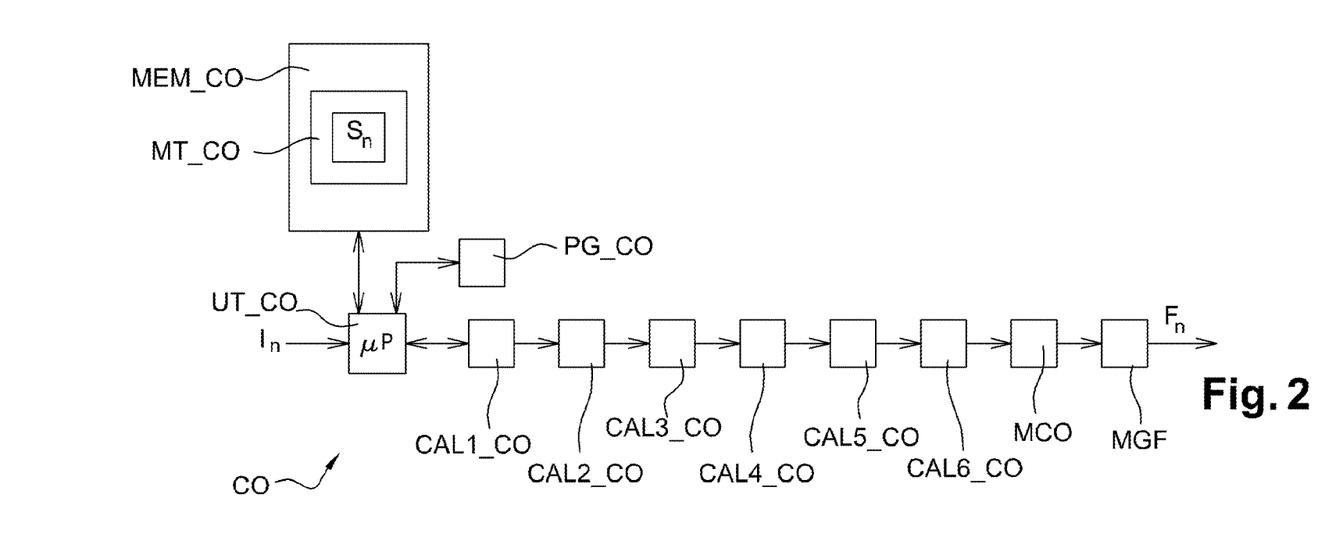
FIG. 2 shows an embodiment of a coder device of the invention.

In an embodiment of the invention, the coding method of the invention is implemented in a coder device CO as shown in FIG. 2.

As shown in FIG. 2, such a coder device comprises a memory MEM_CO having a buffer memory MT_CO, a processor unit UT_CO, e.g. having a microprocessor μP and controlled by a computer program PG_CO that performs the coding method of the invention. On initialization, the code instructions of the computer program PG_CO may for example be loaded into a RAM prior to being executed by the processor of the processor unit UT_CO.

Figure 1:
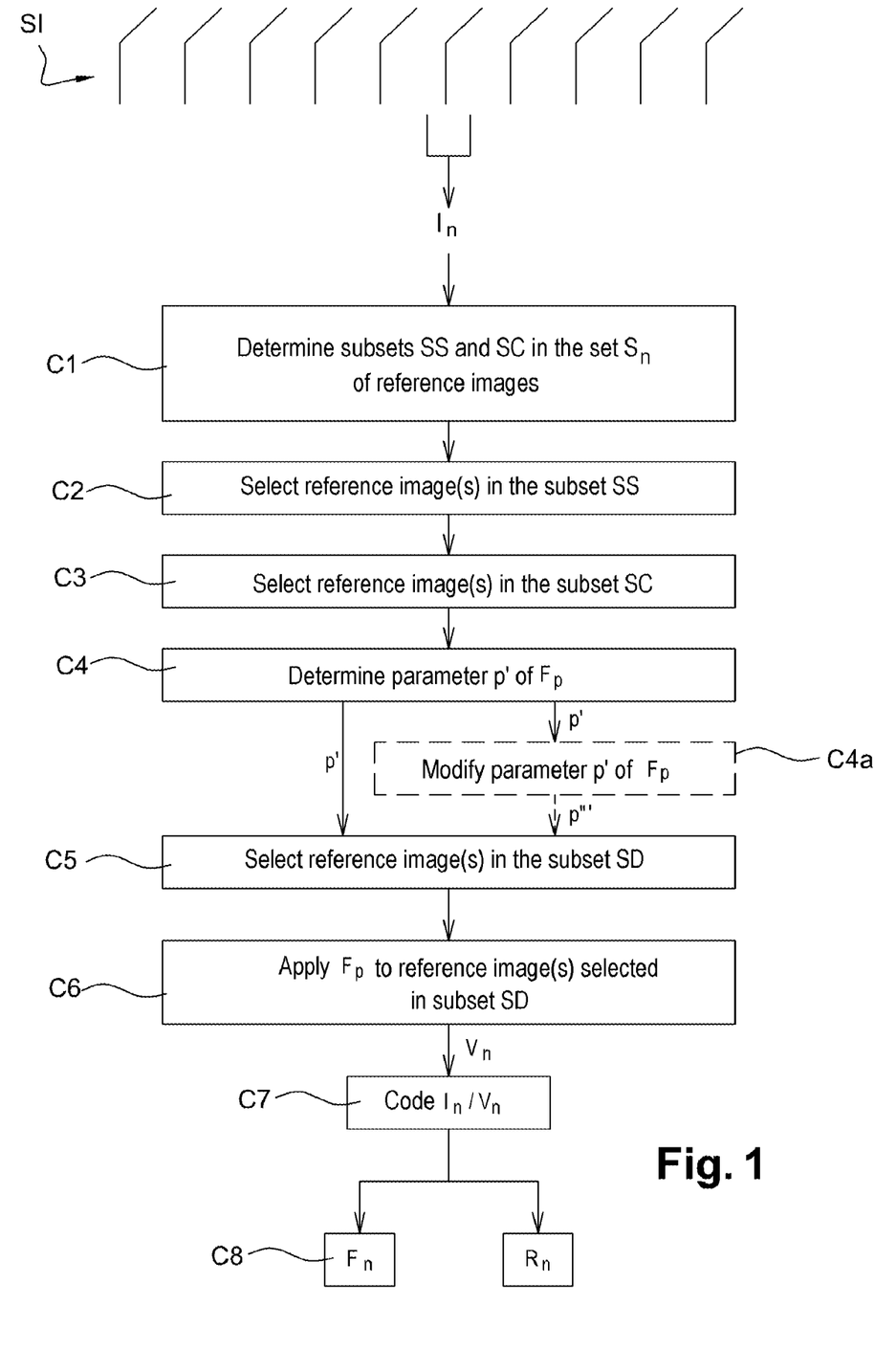
FIG. 1 shows the steps of the coding method of the invention.

The coding method shown in FIG. 1 applies to any current image of an image sequence SI to be coded.

For this purpose, consideration is given to a current image $I_n$ in the image sequence SI. At this stage, a set $S_n$ of reference images $R_{n-1}, R_{n-2}, \ldots, R_{n-M}$ is available in the buffer memory MT_CO of the coder CO, as shown in FIG. 2. M is an integer variable and represents the number of reference images that are available. Given that the resources of the buffer memory MT_CO are limited, it is generally not all of the reference images of the set $S_n$ that are available, but only the M reference images that have been most recently coded and then decoded. In the example shown, M=8.

Figure 3A:
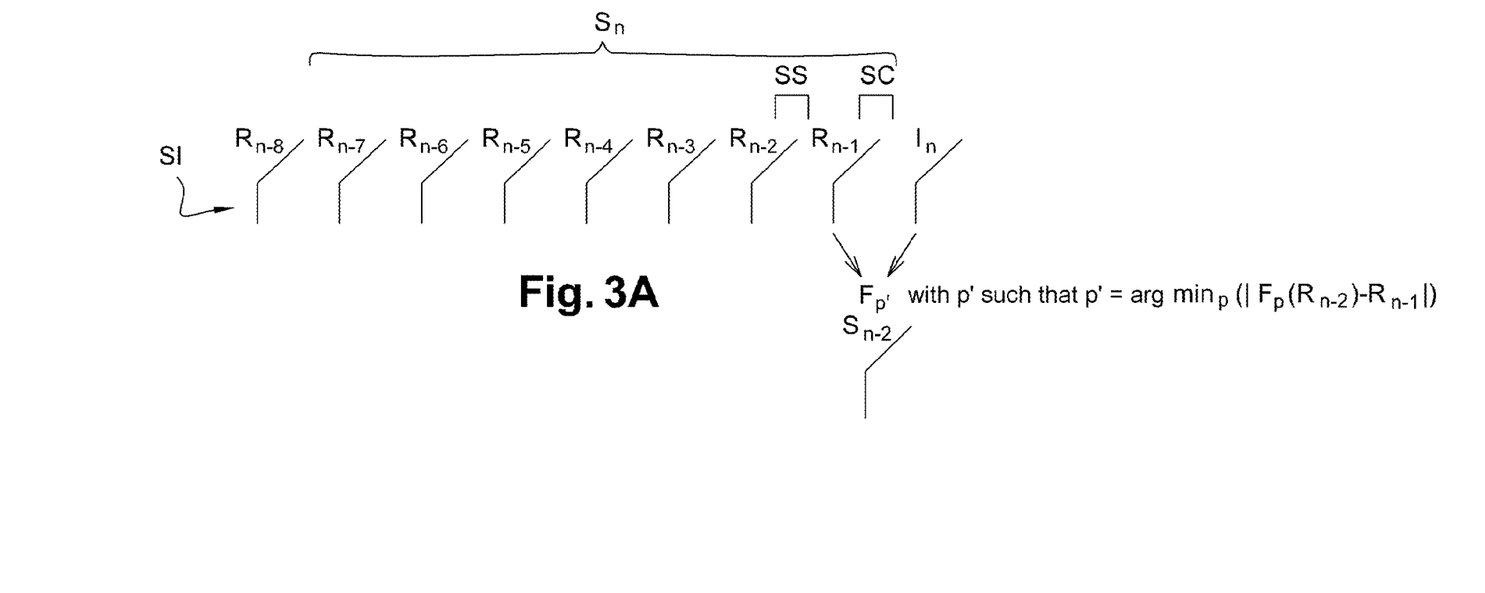
FIG. 3A shows an example of determining at least one parameter p' of a predetermined function $F_P$ suitable for transforming a first subset of a set of reference images into an approximation of a second subset of said set of reference images.

FIG. 3A shows the succession of said M reference images relative to the current image $I_n$ for coding, where $R_{n-8}$ is the reference image farthest away in time from the current image $I_n$ and where $R_{n-1}$ is the reference image closest in time to the current image.

In known manner, such reference images are images of the sequence SI that have previously been coded and then decoded. For inter coding in application of the HEVC standard, the current image $I_n$ is coded from one or more of said reference images.

In accordance with the invention, when the current image is inter coded, prior to inter coding the current image, one or more of said reference images are transformed for the purpose of obtaining one or more respective transformed reference images that are as similar as possible to the current image in terms of texture and movement.

With reference to FIG. 1, during a step C1, a first subset SS of reference images is determined together with a second subset SC of reference images.

In a preferred implementation, each of the first and second subsets contains one respective reference image.

In an alternative implementation, each of the first and second subsets contains two respective reference images.

Naturally, the number of reference images determined in each of the first and second subsets is specific for each current image for coding and may be different.

With reference to FIG. 2, said determination step C1 is performed by a calculation module CAL1_CO of the coder CO, which module is controlled by the microprocessor μP of the processor unit UT_CO.

With reference to FIG. 1, during a step C2, at least one reference image is selected from the first subset SS of reference images determined in step C1.

In a preferred implementation and as shown in FIG. 3A, the reference image $R_{n-1}$ is selected.

In an alternative implementation, the reference images $R_{n-1}$ and $R_{n-1}$ are selected.

With reference to FIG. 2, said selection step C2 is performed by a calculation module CAL2_CO of the coder CO, which module is controlled by the microprocessor μP of the processor unit UT_CO.

With reference to FIG. 1, during a step C3, at least one reference image is selected from the second subset SC of reference images determined in step C1.

In a preferred implementation and as shown in FIG. 3A, the reference image $R_{n-1}$ is selected.

In an alternative implementation, the reference images $R_{n-2}$ and $R_{n-1}$ are selected.

With reference to FIG. 2, said selection step C3 is performed by a calculation module CAL3_CO of the coder CO, which module is controlled by the microprocessor μP of the processor unit UT_CO.

With reference to FIG. 1, during a step C4, at least one parameter p' is determined for a predetermined parametric function $F_P$ that is adapted to transform a number $N_S$ of reference images selected in the first subset SS into an approximation of a number $N_C$ of reference images selected in the second subset SC.

With reference to FIG. 2, said determination step C4 is performed by a calculation module CAL4_CO of the coder CO, which module is controlled by the microprocessor μP of the processor unit UT_CO.

Such an approximation is performed by maximizing a predetermined similarity criterion between at least one image of the first subset SS of reference images and at least one reference image of the second subset SC of reference images.

In a preferred implementation, the approximation is performed by maximizing a predetermined similarity criterion between the selected image $R_{n-2}$ of the first subset SS of reference images and the selected image $R_{n-1}$ of the second subset SC of reference images.

In an alternative implementation, the approximation is performed by maximizing a predetermined similarity criterion between the two images $R_{n-3}$ and $R_{n-4}$ selected from the first subset SS of reference images and respectively the two images $R_{n-2}$ and $R_{n-1}$ selected from the second subset SC of reference images.

In the preferred implementation, a parameter value p' is determined so that the image $F_P(R_{n-2})$ is the best possible approximation of the image $R_{n-1}$, i.e. by minimizing $\|F_P(R_{n-2})-R_{n-1}\|$. The notation $\|F_P(R_{n-2})-R_{n-1}\|$ represents a well-known norm, such as the L2 norm, the L1 norm, or the sup norm, examples of which are given below.

The approximation is performed using a predetermined similarity criterion that consists by way of example in using the L2 norm to determine the value P that minimizes quadratic error (i.e. the sum of squared differences):
  between each first pixel of the image $F_P(R_{n-2})$ and the image $R_{n-1}$; and
  then between each second pixel of the image $F_P(R_{n-2})$ and the image $R_{n-1}$, and so on to the last pixel of each of said two images under consideration.

As shown in FIG. 3A, in accordance with the preferred implementation, an intermediate image $S_{n-1}$ such that $S_{n-1}=F_P(R_{n-2})$ is then obtained and immediately precedes the current image $I_n$ in time.

In other implementations, the minimization does not necessarily provide one or more intermediate images.

In a first variant, the approximation is performed using a predetermined similarity criterion that consists, by way of example, in using the L1 norm to determine the value P that minimizes the absolute error (i.e. the sum of absolute differences):
  between each first pixel of the image $F_P(R_{n-2})$ and the image $R_{n-1}$; and
  then between each second pixel of the image $F_P(R_{n-2})$ and the image $R_{n-1}$, and so on to the last pixel of each of said two images under consideration.

In a second variant, the approximation is performed using a predetermined similarity criterion that consists, by way of example, in minimizing a general function depending on the pixels of each of the images $F_P(R_{n-2})$ and $R_{n-1}$.

The parametric function $F_P$ may take various forms, and non-exhaustive examples thereof are given below.

In a first example, the parametric function $F_P$ is a function that associates an image X made up of a plurality of pixels $x_{i,j}$ ($1 \leq i \leq Q$ and $1 \leq i \leq R$), where Q and R are integers, with an image Y constituted by a plurality of pixels $y_{i,j}$ using the following relationship:

$$y_{i,j}=Ax_{i,j}+B$$

where p'={A,B}, where A and B are real numbers.

The parameters A and B are optimized by conventional approaches such as an exhaustive search, a genetic algorithm, etc. . . . .

An exhaustive search consists in the parameters A and B taking their respective values in a predetermined set. For example, the values of the parameter A may belong to the predetermined set of values {0.98, 0.99, 1.0, 1.01, 1.02} and the values of the parameter B may belong to the set of predetermined values {−2, −1, 0, 1, 2}. All possible value combinations are then tested and the combination that optimizes the similarity criterion is conserved.

Known discrete optimization methods may also be used for avoiding the need to explore all combinations, which is expensive in terms of computation. An example of such an optimization method is the well-known genetic algorithm as described as the following Internet address: http://fr.wikipedia.org/w/index.php?title=Algorithme_g%C3%A9n%C3%A9tique&oldid=83138231

In a second example, the parametric function $F_P$ is a movement compensation. Under such circumstances, the image Y is made up of a plurality of blocks that have been coded using movement compensation prediction with blocks coming from the image X. For a block under consideration of the image Y there is an associated motion vector that describes the movement between a corresponding block in the image X and the block under consideration in the image Y. The set of motion vectors forms a plurality of parameters p' of the function $F_P$.

In this second example, it is assumed that the image Y is the image $R_{n-1}$ of the second subset SC and that the image X is the image $R_{n-2}$ of the first subset SS. The approximation is performed using a predetermined similarity criterion that consists in splitting the image $R_{n-1}$ into a plurality of blocks and then for a block under consideration in the image $R_{n-1}$ determining which block in the image $R_{n-2}$ is the most similar in terms of texture and of movement. The motion vector associated with said most similar block is then included in the parameters p'.

In a third example, the parametric function $F_P$ is a Wiener filter which is itself well known and which is described by way of example at the Internet address http://fr.wikipedia.org/wiki/D%C3%A9convolution_de_Wiener The approximation is performed using a predetermined similarity criterion that, for a given filter medium, consists in determining the Wiener filter that filters the image $R_{n-2}$ so as to obtain the best possible similarity with the image $R_{n-1}$. The coefficients of the determined Wiener filter then form the plurality of parameters p'.

In a fourth example, the parametric function $F_P$ may also be a combination of the above-mentioned parametric functions. Under such circumstances, the image Y may be split into a plurality of zones obtained for example using segmentation that is a function of certain criteria (distortion criterion, uniformity criterion for the zone as a function of certain characteristics such as the local energy of the video signal). Each zone of the image Y may then be approximated using one of the above-described examples. A first zone of the image Y may be approximated for example by using Wiener filtering. A second zone of the image Y may for example be approximated by using movement compensation. A third zone of the image Y, if it presents little contrast, may for example use the identity function, i.e. it need not be approximated at all, etc. . . . . The various parameters p' of the parametric function $F_P$ are then constituted by the segmentation information and the parameters associated with each segmented zone of the image Y.

In the alternative implementation in which pairs of reference images $R_{n-4}$ & $R_{n-3}$ and $R_{n-2}$ & $R_{n-1}$ are selected respectively from the first and second subsets SS and SC, the parameter function is in the form of a multidimensional function $FA_T$ such that $$FA_T(R_{n-4}, R_{n-3})=(R_{n-2}, R_{n-1})$$

that associates the two reference images $R_{n-4}$, $R_{n-3}$ respectively with the two reference images $R_{n-2}$, $R_{n-1}$. In this alternative implementation, it may be considered for example that $$FA_T(R_{n-4},R_{n-3})=(F_{T1}(R_{n-4}), F_{T2}(R_{n-3}))$$

where F is the same function as the above-mentioned parametric function $F_P$ as described for the preferred implementation.

In accordance with this alternative implementation, at least one parameter value p" of the parameter T is determined. The value p" is the union of two values p1 and p2, where p1 and p2 are respectively the optimum values of the parameters T1 and T2 when performing the approximation of $R_{n-2}$ by $FT_T(R_{n-4})$ and of $R_{n-1}$ by $F_{T2}(R_{n-3})$.

Figure 3B:
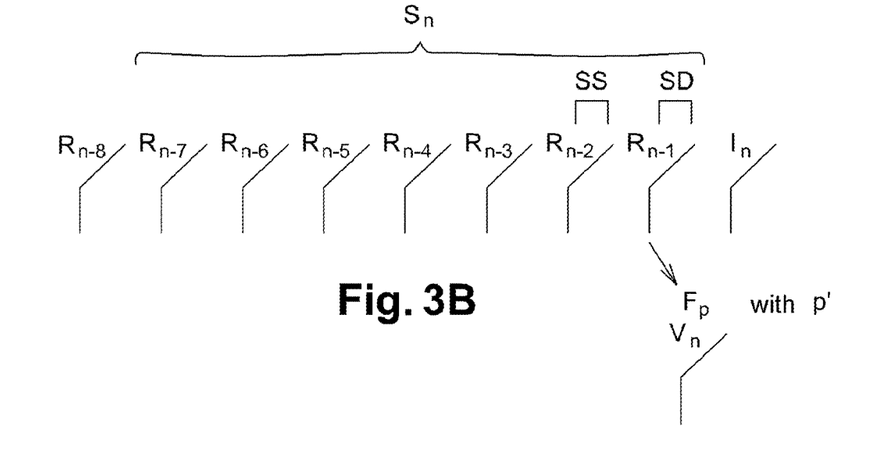
FIG. 3B shows an example of applying the predetermined function $F_P$ with the parameter p' to a third subset of said reference image set.

With reference to FIG. 1, during a step C5, one or more reference images are selected for application of the function $F_P$ in order to obtain one or more new reference images. As shown in FIG. 3B, such selection is performed in a third subset SD of the set $S_n$ of reference images, said third subset SD being different from the first subset SS and containing one or more reference images that are the closest in time to the current image $I_n$.

In the preferred implementation shown in FIG. 3B, the reference image selected in the subset SD is the image $R_{n-1}$.

In the alternative implementation, the images selected in the subset SD are the images $R_{n-1}$ and $R_{n2}$.

In general manner, the third subset SD contains at least one of the images of the second subset SC. More particularly, the images selected in this third subset are images that are offset in time by +1 relative to the images of the first subset SS.

Thus, in the preferred implementation shown in FIG. 3B, the image $R_{n-1}$ in the third subset SD is the image immediately following in time the image $R_{n-2}$ of the first subset SS. In the alternative implementation, the images $R_{n-2}$ and $R_{n-1}$ that are selected in the third subset SD are the images immediately following in time the images $R_{n-4}$ and $R_{n-3}$ that are contained in the first subset SS of reference images.

With reference to FIG. 2, the above-specified selection step C5 is performed by a calculation module CAL5_CO of the coder CO, which module is controlled by the microprocessor µP of the processor unit UT_CO.

With reference to FIG. 1, during a step C6, the function $F_P$ with the parameter p' as determined in step C4 is applied to the image(s) selected from the third subset SD. At the end of this step C6, one or more new reference images are obtained.

In the preferred implementation, a new reference image $V_n$ is obtained such as $V_n = F_P(R_{n-1})$ using the parameter p'.

In the alternative implementation, the new reference images $V_{n-1}$ and $V_n$ are obtained such that $$(V_{n-1}, V_n) = FA_T(R_{n-2}, R_{n-1})$$

using the parameter p".

With reference to FIG. 2, the application step C6 is performed by a calculation module CAL6_CO of the coder CO, which module is controlled by the microprocessor µP of the processor unit UT_CO.

With reference to FIG. 1, during a step C7, the current image $I_n$ is coded from the new reference image(s) obtained at the end of step C6.

With reference to FIG. 2, the coding step C7 is performed by a coder module MCO of the coder CO, which module is controlled by the microprocessor µP of the processor unit UT_CO. The module MCO is described in the description below.

With reference to FIG. 1, during a step C8, a bit stream $F_n$ is produced representing the current image $I_n$ coded by the above-mentioned coder module MCO, together with a decoded version $R_n$ of the current image $I_n$ suitable for reuse as a reference image in the set $S_n$ of reference images in application of the coding method of the invention.

With reference to FIG. 2, the step C8 of producing a current stream $F_n$ is performed by a stream generator module MGF that is adapted to produce data streams, such as bits, for example. Said module MGF is controlled by the microprocessor µP of the processor unit UT_CO.

The current stream $F_n$ is then transmitted over a communications network (not shown) to a remote terminal. The remote terminal includes a decoder DO shown in FIG. 7 and described in greater detail in the description below.

With reference to FIG. 1, during an optional coding step C4a shown in dashed lines in FIG. 1, the parameter p' determined in above-mentioned step C4 is modified into another parameter p'" in order to take account of the images to which it applies. For this purpose, the parameter p'" is calculated beforehand on the basis of the determined parameter p'. Such a step may be particularly useful, for example, when the function $F_P$ is merely a reduction in the overall brightness of the image, i.e. a "fade to black". For example, by observing the succession of reference images $R_{n-4}$, $R_{n-3}$, $R_{n-2}$, and $R_{n-1}$, it may be observed that the shift towards black has a value of −10 between $R_{n-4}$ and $R_{n-3}$, a value of −9 between $R_{n-3}$ and $R_{n-2}$, and a value of −8 between $R_{n-2}$ and $R_{n-1}$. This thus constitutes a fade to black with varying speed. Insofar as the new reference image that is obtained at the end of step C6 of applying the function $F_P$ is situated at the instant in time following the instant in time at which is situated the reference image to which the function $F_P$ is applied, i.e. at the instant in time of the image $I_n$, it is appropriate to adapt the value of the parameter p' so that the value of the shift in brightness is −7, i.e. the value of the shift between the reference image $R_{n-1}$ and the current image $I_n$.

In the preferred implementation where the parametric function $F_P$ is applied to the reference image $R_{n-1}$ with p'"=−7 instead of p'=−8, the new reference image $V_n$ that is obtained has higher probability of being more similar to the current image $I_n$ in terms of texture and movement.

When the modification step C4a is performed, the step C6 of applying the parametric function $F_P$ is performed using said parameter p'".

Figure 4:
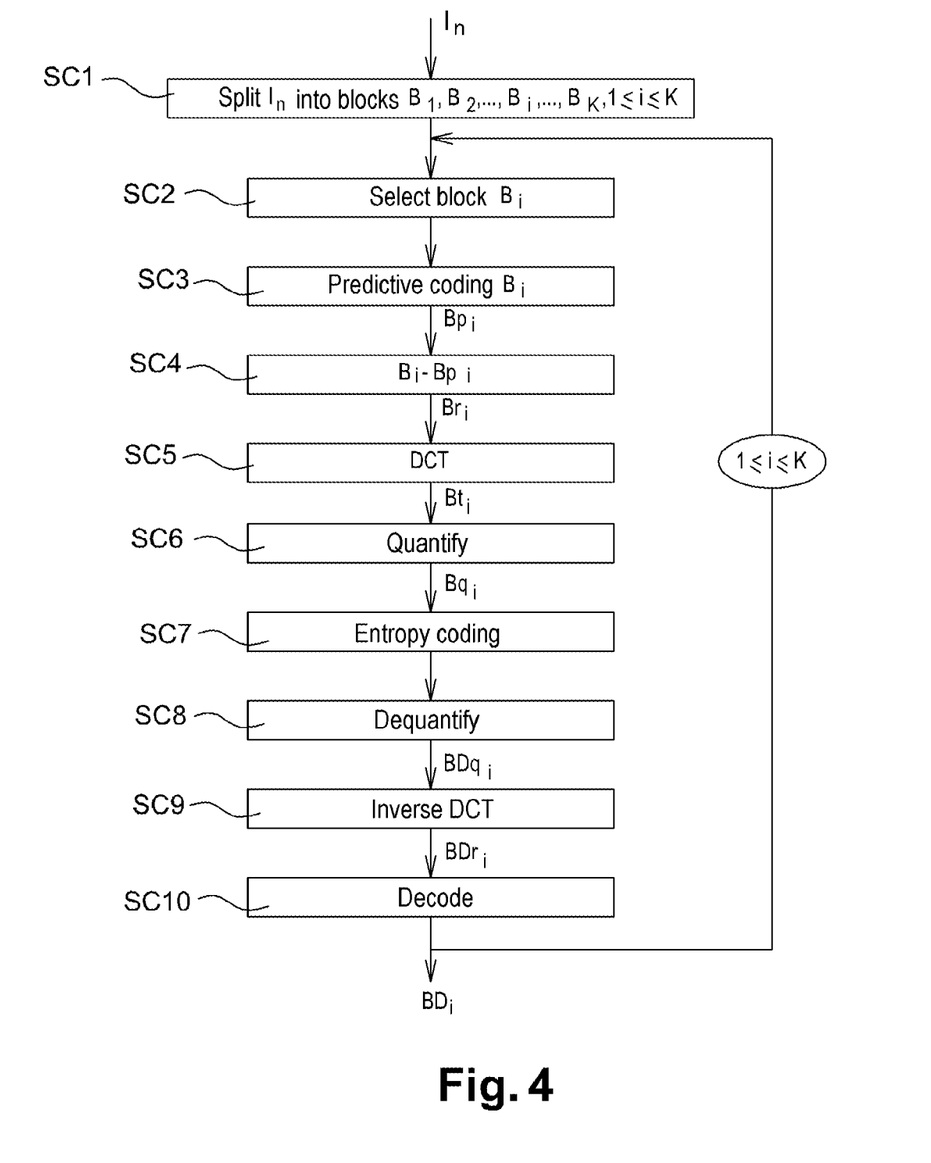
FIG. 4 shows coding substeps performed in the coding method of FIG. 1.

With reference to FIG. 4, there follows a description of the substeps specific to the step C7 of coding the current image $I_n$. Such specific substeps are performed by the coder module MCO of FIG. 2, which is described in greater detail with reference to FIG. 5.

With reference to FIG. 4, the first substep SC1 is splitting the current image $I_n$ into a plurality of blocks $B_1, B_2, \ldots, B_i, \ldots, B_K$, with $1 \leq i \leq K$. In the example shown, K=16. A macroblock is conventionally a block having a predetermined maximum size. Such a macroblock may also itself be split into smaller blocks. For simplification purposes, the term "block" is used herein to refer both to a block and to a macroblock. In the example shown, said blocks are square in shape and they are all of the same size. Depending on the size of the image, which is not necessarily a multiple of the size of the blocks, the last blocks on the left and the last blocks at the bottom need not be square. In an alternative implementation, the blocks may for example be rectangular in shape and/or they need not be in alignment with one another.

Figure 5:
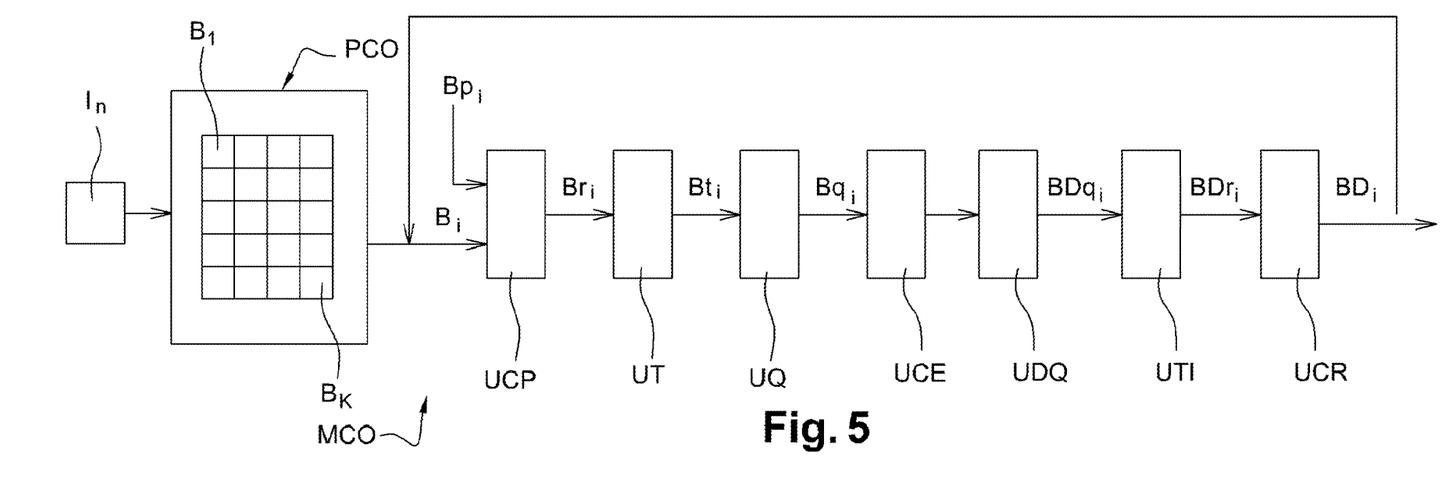
FIG. 5 shows an embodiment of a coder module suitable for performing the coding substeps shown in FIG. 4.

Such splitting is performed by a partitioner module PCO shown in FIG. 5 which, by way of example, uses a well-known partitioning algorithm.

During a substep SC2 shown in FIG. 4, the coder module MCO selects as its current block, the first block for coding $B_1$ of the current image $I_n$. In the preferred implementation, blocks of an image are selected in a lexicographic order, i.e. using a raster type scan starting from the block situated at the top left corner of the image and continuing to the block situated at the bottom right corner of the image.

During a substep SC3 shown in FIG. 4, the current block $B_1$ is subjected to predicted coding by known intra and/or inter prediction techniques, during which the block $B_1$ is predicted relative to at least one block that has previously been coded and then decoded.

With reference to FIG. 5, said predicted coding step SC3 is performed by a predicted coder unit UCP that is suitable for performing predicted coding of the current block using conventional prediction techniques, such as intra and/or inter mode coding, for example.

When performing predicted coding in inter mode, the current block $B_1$ is predicted relative to a block coming from an image that has previously been coded and decoded. Under such circumstances, and in accordance with the invention, the image that has previously been coded and decoded is an image that was obtained following above-described step C6, as shown in FIG. 1.

It is naturally possible to envisage using other types of prediction. Among possible types of prediction for a current block, the optimum prediction is selected in application of a distortion data rate criterion that is well known to the person skilled in the art.

Said above-mentioned predicted coding step serves to construct a predicted block $Bp_1$, which is an approximation to the current block $B_1$. Information about this predicted coding is subsequently written into the stream $F_n$ that is transmitted to the decoder DO. Such information comprises in particular the prediction time (inter or intra), and where appropriate the inter prediction mode, the type of partitioning of a block or a macroblock if a macroblock has been subdivided, the index of the reference image, and the motion vector used in the inter prediction mode. This information is compressed by the coder CO shown in FIG. 2.

During a substep SC4 shown in FIG. 4, the predicted coder unit UCP of FIG. 5 proceeds to subtract the predicted block Bp, from the current block $B_1$ in order to produce a residue block $Br_1$.

During a substep SC5 shown in FIG. 4, the residue block $Br_1$, is transformed using a conventional forward transformation operation such as, for example, a discrete cosine transform (DCT) type transformation in order to produce a transformed block $Bt_1$.

Said substep SC5 is performed by a transformation unit UT shown in FIG. 5.

During a substep SC6 shown in FIG. 4, the transformed block $Bt_1$ is quantified using a conventional quantification operation, such as for example scalar quantification. This produces a quantified coefficient block $Bq_1$.

Said substep SC6 is performed by a quantification unit UQ shown in FIG. 5.

During a substep SC7 shown in FIG. 4, entropy coding is performed on the quantified coefficient block $Bq_1$. In the preferred implementation, this is CABAC entropy coding that is well known to the person skilled in the art.

Said substep SC7 is performed by an entropy coder unit UCE shown in FIG. 5.

During a substep SC8 shown in FIG. 4, the block $Bq_1$ is dequantified using a conventional dequantification operation, which operation is the inverse of the quantification performed in substep SC6. This produces a dequantified coefficient block $BDq_1$.

Said substep SC8 is performed by a dequantification unit UDQ shown in FIG. 5.

During a substep SC9 shown in FIG. 4, the dequantified coefficient block $BDq_1$ is subjected to the inverse transformation, which operation is the inverse of the forward transformation performed in above substep SC5. This produces a decoded residue $BDr_1$.

Said substep SC9 is performed by an inverse transformation unit UTI shown in FIG. 5.

During a substep SC10 shown in FIG. 4, the decoded block $BD_1$ is constructed by adding the decoded residue block $BDr_1$ to the predicted block $Bp_1$. It should be observed that the decoded residue block is the same as the decoded block obtained at the end of the method of decoding the image $I_n$ as described in the description below. The decoded block $BD_1$ is thus made available for reuse by the coder module MCO.

Said substep SC10 is performed by a construction unit UCR shown in FIG. 5.

Said coding substeps as described above are performed for all of the blocks decoded in the current image $I_n$ under consideration.

DETAILED DESCRIPTION OF AN IMPLEMENTATION OF THE DECODING PORTION

An implementation of the decoding method of the invention is described below in which the decoding method is implemented in software or hardware manner by modifying a decoder initially in compliance with the HEVC standard.

Figure 6:
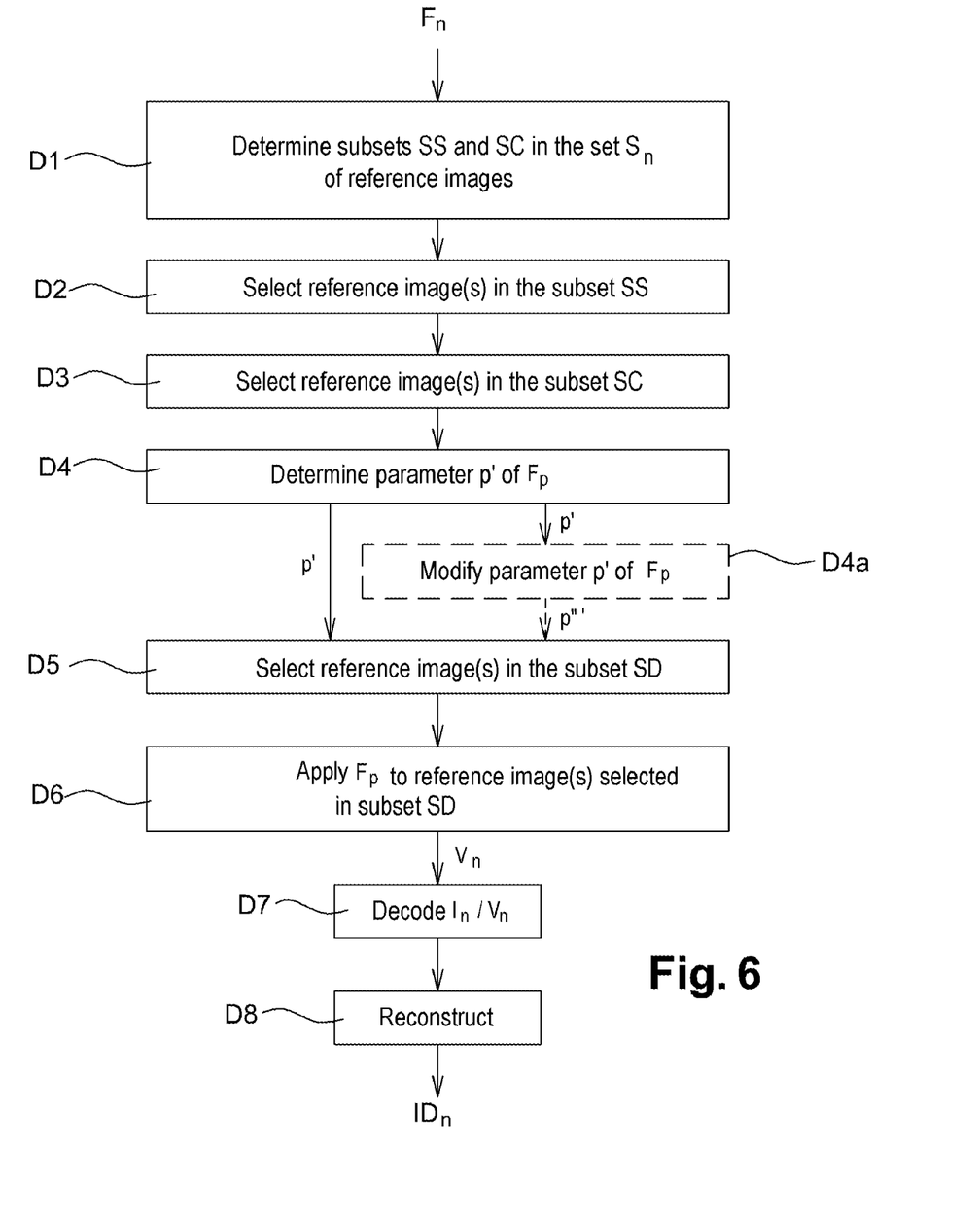
FIG. 6 shows steps of the decoding method of the invention.

The decoding method of the invention is shown in the form of an algorithm having steps D1 to D8 shown in FIG. 6.

Figure 7:
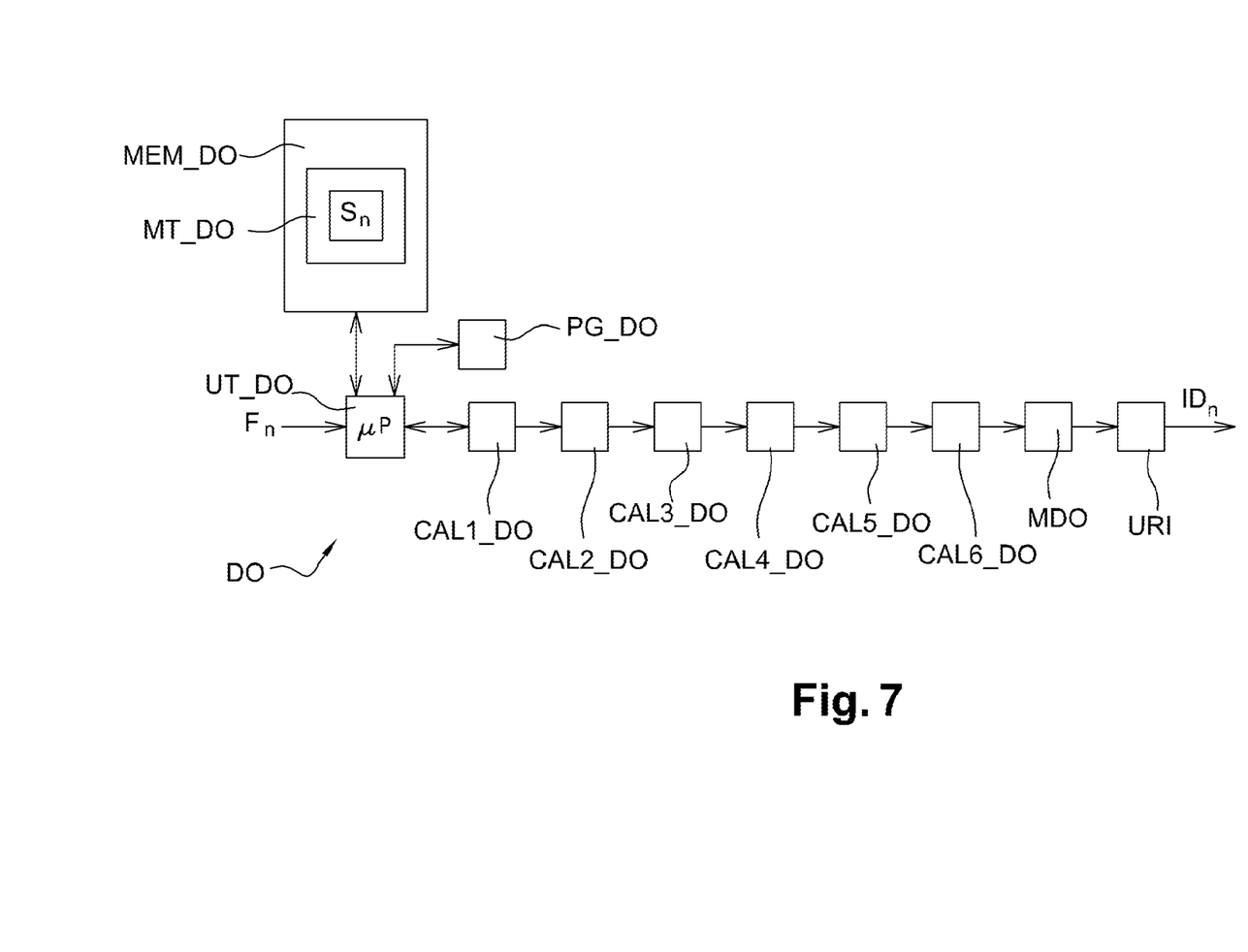
FIG. 7 shows an embodiment of a decoder device of the invention.

In the embodiment of the invention, the decoding of the method is implemented in a decoder device DO shown in FIG. 7.

As shown in FIG. 7, such a decoder device comprises a memory MEM_DO having a buffer memory MT_DO, a processor unit UT_DO e.g. having a microprocessor µP and controlled by a computer program PG_DO that performs the decoding method of the invention. On initialization, the code instructions of the computer program PG_DO are loaded for example into a RAM prior to being executed by the processor of the processor unit UT_DO.

The decoding method shown in FIG. 6 applies to every current image of an image sequence SI to be decoded.

For this purpose, information representative of the current image $I_n$ to be decoded is identified in the stream $F_n$ received by the decoder. At this stage, a set $S_n$ of reference images $R_{n-1}, R_{n-2}, \ldots, R_{n-M}$ is available in the buffer memory MT_DO of the decoder DO, as shown in FIG. 7. M is an integer variable that represents the number of reference images that are available. Because the resources of the buffer memory MT_DO are limited, it is generally not all of the reference images of the set $S_n$ that are available, but only the M most recently decoded reference images. In the example shown, M=8.

FIG. 3A shows the succession of said M reference images relative to the current image $I_n$ to be decoded, where $R_{n-8}$ is the reference image farthest away in time from the current image $I_n$ and where $R_{n-1}$ is the reference image closest in time to ht current image.

In known manner, such reference images are images of the sequence Si that have previously been coded and then decoded. When using inter decoding in compliance with the HEVC standard, the current image $I_n$ is decoded from one or more of said reference images.

In accordance with the invention, when a current image is inter decoded, prior to inter decoding the current image, one or more of said reference images are transformed in order to obtain respectively one or more transformed reference images that are as similar as possible to the current image in terms of texture and movement.

Said reference images are transformed by decoding in a manner similar to coding, in particular similar to steps C1 to C6 shown in FIG. 1.

With reference to FIG. 6, during a step D1, a first subset SS of reference images is determined together with a second subset SC of reference images. Since such a step is identical to above-described step C1, it is not described in greater detail.

With reference to FIG. 7, said determination step D1 is performed by a calculation module CAL1_DO of the decoder DO, which module is controlled by the microprocessor µP of the processor unit UT_DO.

With reference to FIG. 6, during a step D2, at least one reference image is selected from the first subset SS of reference images determined in D1. Since such a step is identical to above-described step C2, it is not described in greater detail.

With reference to FIG. 7, said selection step D2 is performed by a calculation module CAL2_DO of the decoder DO, which module is controlled by the microprocessor µP of the processor unit UT_DO.

With reference to FIG. 6, during a step D3, at least one reference image is selected from the second subset SC of reference images as determined in step D1.

Such a step is identical to above-described step C3 so it is not described in greater detail.

With reference to FIG. 6, said selection step D3 is performed by a calculation module CAL3_DO of the decoder DO, which module is controlled by the microprocessor µP of the processor unit UT_DO.

With reference to FIG. 6, during a step D4, at least one parameter p' of a predetermined parametric function $F_P$ is determined, which function is adapted to transform a number $N_S$ of reference images selected from the first subset SS into an approximation of a number $N_P$ of reference images selected in the second subset SC.

With reference to FIG. 7, said determination step D4 is performed by a calculation module CAL4_DO of the decoder DO, which module is controlled by the microprocessor µP of the processor unit UT_DO.

Since the step D4 is identical to above-described step C4, it is not described in greater detail.

With reference to FIG. 6, during a step D5, one or more reference images are selected for having the function $F_P$ applied thereto in order to obtain one or more new reference images. Since step D5 is identical to above-described step C5, it is not described in greater detail.

With reference to FIG. 7, the above-described selection step D5 is performed by a calculation module CAL5_DO of the decoder DO, which module is controlled by the microprocessor µP of the processor unit UT_DO.

With reference to FIG. 6, during a step D6, the function $F_P$ using the parameter p' determined in step D4 is applied to the image(s) selected from the third subset SD. At the end of this step D6, one or more new reference images are obtained.

Since the step D6 is identical to above-described step C6, it is not described in greater detail.

With reference to FIG. 7, the application selection step D6 is performed by a calculation module CAL6_DO of the decoder DO, which module is controlled by the microprocessor µP of the processor unit UT_DO.

With reference to FIG. 6, during a step D7, the current image $I_n$ is decoded from the new reference image(s) obtained from step D6.

With reference to FIG. 7, the decoding step D7 is performed by a decoder module MDO of the decoder DO, which module is controlled by the microprocessor µP of the processor unit UT_DO. The module MDO is described below in the description.

With reference to FIG. 6, during a step D8, a decoded image $ID_n$ is reconstructed.

With reference to FIG. 7, the reconstruction step D8 is performed by a reconstruction unit URI that writes the decoded blocks into a decoded image progressively as these blocks become available.

With reference to FIG. 6, during an optional coding step D4a shown in dashed lines in FIG. 6, the parameter p' determined in above-described step D4 is modified to obtain another parameter p''' that is to be taken into account in the images to which it applies.

Since the step D4a is identical to above-described step C4a, it is not described in greater detail.

Figure 8:
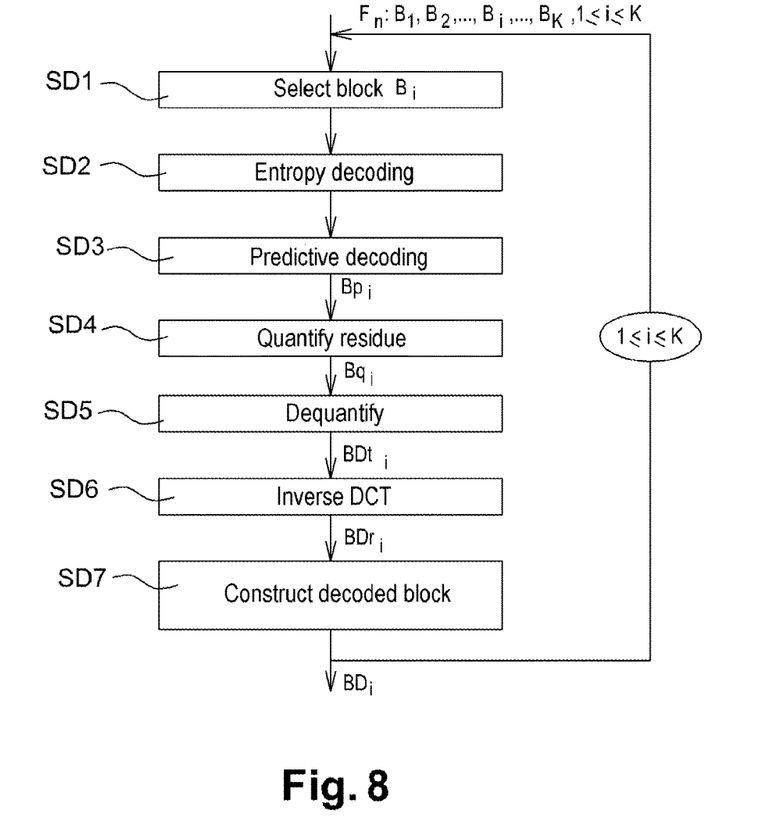
FIG. 8 shows decoding substeps performed in the decoding method of FIG. 6.

With reference to FIG. 8, there follows a description of the substeps specific to the step D7 of decoding the current image $I_n$. Such specific substeps are performed by the decoder module MDO of FIG. 7, which itself is described in greater detail with reference to FIG. 9.

Figure 9:
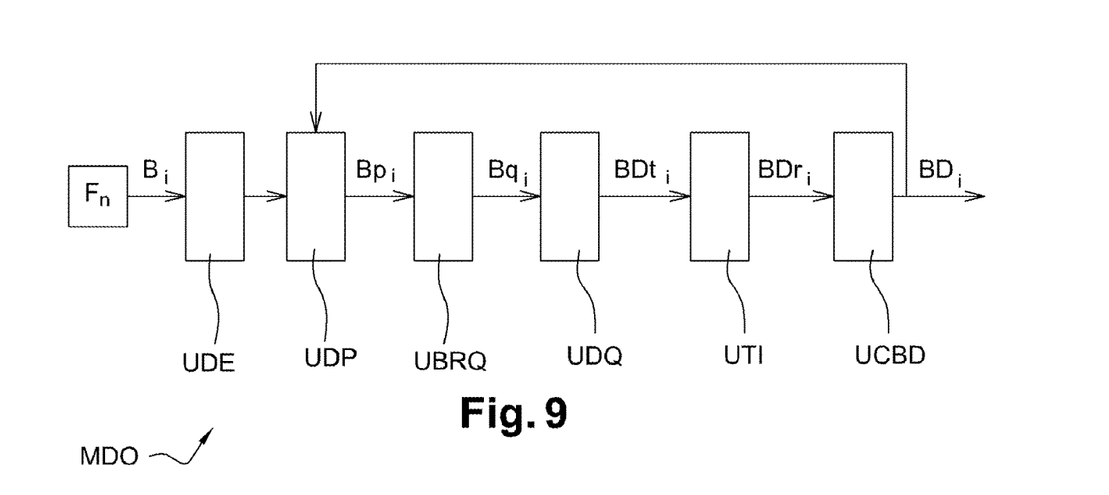
FIG. 9 shows an embodiment of a decoder module suitable for performing the decoding substeps shown in FIG. 8.

During a substep SD1 shown in FIG. 8, the decoder module MDO shown in FIG. 9 selects the first block for decoding $B_1$ from the stream $F_n$ as the current block.

During a substep SD2 shown in FIG. 8, entropy decoding is performed on syntax elements associated with the current block $B_1$ by reading the stream $F_n$ with the help of a stream pointer. Such a step consists mainly in:
  reading the bits contained at the beginning of the stream $F_n$ associated with the first coded block $B_1$; and
  reconstructing the symbols from the bits that are read.

More precisely, the syntax elements associated with the current block are decoded by a CABAC entropy decoder unit UDE, as shown in FIG. 9. Such a unit is itself well known and is not described in greater detail.

During a substep SD3 shown in FIG. 8, conventional intra and/or inter prediction techniques are used to perform predicted decoding of the current block $B_1$, thereby predicting the block $B_1$ relative to at least one previously decoded block.

During this step, the predicted decoding is performed with the help of the syntax elements decoded in the preceding step and comprising in particular the type of prediction (inter or intra), and where appropriate, the intra prediction mode, the type of partitioning used for a block or a macroblock if the macroblock has been subdivided, the index of the reference image, and the motion vector used in the inter prediction mode.

Said above-described predicted decoding step serves to construct a predicted block $Bp_1$, relative to a block obtained from a previously decoded image. Under such circumstances, and in accordance with the invention, the previously decoded image is an image as obtained from above-described step D6, as shown in FIG. 6.

This step is performed by a predicted decoder unit UDP as shown in FIG. 9.

During a substep SD4 shown in FIG. 8, a quantified residue block $Bq_1$ is constructed with the help of the previously decoded syntax elements.

Such a step is performed by a quantified residue block construction unit UBRQ as shown in FIG. 9.

During a substep SD5 shown in FIG. 8, the quantified residue block $Bq_1$ is dequantified using a conventional dequantification operation that is the inverse of the quantification operation performed in above-described substep SC6, thereby producing a decoded dequantified block $BDt_1$.

Said substep SD5 is performed by a dequantification unit UDQ shown in FIG. 9.

During a substep SD6, the dequantified block $BDt_1$ is subjected to inverse transformation, i.e. to the operation that is the inverse of the forward transformation performed in above-described substep SC5. A decoded residue block $BDr_1$ is thus obtained.

Said substep SD6 is performed by an inverse transformation unit UTI shown in FIG. 9.

During a substep SD7, the decoded block $BD_1$, is constructed by adding the decoded residue block $BDr_1$ to the predicted block $Bp_1$. The decoded block $BD_1$, is thus made available for use by the decoder module MDO of FIG. 9.

Said substep SD7 is performed by a decoded block construction unit UCBD as shown in FIG. 9.

The above-described decoding substeps are performed for all of the blocks for decoding in the current image $I_n$ under consideration.

Naturally, the implementations that are described above are given purely by way of non-limiting indication and numerous modifications may easily be applied by the person skilled in the art without thereby going beyond the ambit of the invention.

The invention claimed is:

1. A method of coding at least one current image, the method comprising: the following acts performed by a coder device:
    determining at least one parameter of a predetermined parametric function between images from a first subset of a set of previously decoded reference images and images from a second subset of images of said set of reference images, said images from the first subset and from the second subset being distinct from said at least one current image, wherein, for at least said current image, each of said first and second subsets contains at least two respective reference images;
    selecting a third subset of said set of reference images, said third subset being different from said first subset and comprising at least two reference images of said set of reference images that are the closest in time to the current image;
    applying said function with the determined parameter to the third subset of said set of reference images, thereby obtaining another set of at least two previously decoded reference images; and
    coding the current image from said obtained other set of reference images.

2. The method according to claim 1, during which said act of determining at least one parameter is performed by maximizing a predetermined similarity criterion between said approximation of the second subset of reference images and said second subset of reference images.

3. The coding method according to claim 1, during which said act of applying the function is performed using a parameter other than said determined parameter, which other parameter is calculated beforehand from said determined parameter.

4. A coder device for coding at least one current image, the device comprising:
    a non-transitory computer-readable medium comprising instructions stored thereon; and
    a processor configured by the instructions to perform acts comprising:
    determining at least one parameter of a predetermined parametric function between images from a first subset of a set of previously decoded reference images into and images from a second subset of images of said set of reference images, said images from the first subset and from the second subset being distinct from said at least one current image, wherein, for at least said current image, each of said first and second subsets contains at least two respective reference images;
    selecting a third subset of said set of reference images, said third subset being different from said first subset and comprising at least two reference images of said set of reference images that are the closest in time to the current image;
    applying said function with the determined parameter to athe third subset of said set of reference images, in order to obtain another set of at least two previously decoded reference images; and
    coding the current image from said obtained other set of reference images.

5. A method of decoding a coded current image, the method comprising the following acts performed by a decoding device:
    determining at least one parameter of a predetermined parametric function between images from a first subset of a set of previously decoded reference images and images from a second subset of images of said set of reference images, said images from the first subset and from the second subset being distinct from said current image, and wherein, for said current image, each of said first and second subsets contains at least two respective reference images;
    selecting a third subset of said set of reference images, said third subset being different from said first subset and comprising at least two reference images of said set of reference images that are the closest in time to the current image;
    applying said function with the determined parameter to the third subset of said set of reference images, thereby obtaining another set of at least two previously decoded reference images; and
    decoding the current image from said obtained other set of reference images.

6. The method according to claim 5, during which said act of determining at least one parameter is performed by maximizing a predetermined similarity criterion between said approximation of the second subset of reference images and said second subset of reference images.

7. The decoding method according to claim 5, during which said act of applying the function is performed using a parameter other than said determined parameter, which other parameter is calculated beforehand from said determined parameter.

8. A device for decoding a coded current image, the device comprising:
    a non-transitory computer-readable medium comprising instructions stored thereon; and
    a processor configured by the instructions to perform acts comprising:
    determining at least one parameter of a predetermined parametric function between images from a first subset of a set of previously decoded reference images and images from a second subset of images of said set of reference images, said images from the first subset and from the second subset being distinct from said current image, wherein, for said current image, each of said first and second subsets contains at least two respective reference images;
    selecting a third subset of said set of reference images, said third subset beinq different from said first subset and comprising at least two reference images of said set of reference images that are the closest in time to the current image;

applying said function with the determined parameter to the third subset of said set of reference images, in order to obtain another set of at least two previously decoded reference images; and decoding the current image from said obtained other set of reference images.

9. A non-transitory computer readable data storage medium having recorded thereon a computer program including instructions for executing a method of decoding a coded current image, when said program is executed by a computer, the method comprising acts of:

determining at least one parameter of a predetermined parametric function between images from a first subset of a set of previously decoded reference images and images from a second subset of images of said set of reference images, said images from the first subset and from the second subset being distinct from said current image, and wherein, for said current image, each of said first and second subsets contains at least two respective reference images;

selecting a third subset of said set of reference images, said third subset being different from said first subset and comprising at least two reference images of said set of reference images that are the closest in time to the current image;

applying said function with the determined parameter to the third subset of said set of reference images, thereby obtaining another set of previously decoded reference images; and decoding the current image from said obtained other set of reference images.

10. The method according to claim 1, further comprising: transmitting a bit stream containing the coded current image over a communications network.

11. The coder device according to claim 5, wherein the processor is configured by the instructions to transmit a bit stream containing the coded current image over a communications network.

12. The method according to claim 8, further comprising: receiving a bit stream containing the coded current image over a communications network.

13. The device for decoding according to claim 8, wherein the processor is configured by the instructions to receive a bit stream containing the coded current image over a communications network.

14. The non-transitory computer readable data storage medium according to claim 9, further comprising instructions that configure the computer to:

receive a bit stream containing the coded current image over a communications network.

* * * * *

UNITED STATES PATENT AND TRADEMARK OFFICE
CERTIFICATE OF CORRECTION

PATENT NO. : 10,869,030 B2  
APPLICATION NO. : 14/431202  
DATED : December 15, 2020  
INVENTOR(S) : Felix Henry

Page 1 of 1

It is certified that error appears in the above-identified patent and that said Letters Patent is hereby corrected as shown below:

In the Claims

In Claim 4, Column 16, Line 9:
Please delete "athe" and insert --the--.

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*